United States Patent [19]

Kaku

[11] Patent Number: 4,799,214

[45] Date of Patent: Jan. 17, 1989

[54] TWO-WIRE FULL DUPLEX FREQUENCY DIVISION MULTIPLEX MODEM SYSTEM HAVING ECHO CANCELLATION MEANS

[75] Inventor: Takashi Kaku, Tama, Japan

[73] Assignee: Fujitsu Limited, Kawasaki, Japan

[21] Appl. No.: 944,508

[22] Filed: Dec. 22, 1986

[30] Foreign Application Priority Data

Dec. 23, 1985 [JP] Japan .................. 60-289966

[51] Int. Cl.$^4$ ............................................. H04B 9/00
[52] U.S. Cl. .................... 370/32.1; 379/410
[58] Field of Search ............... 370/32.1, 30; 379/406, 379/407, 410, 411

[56] References Cited

U.S. PATENT DOCUMENTS

| | | | |
|---|---|---|---|
| 4,072,830 | 2/1978 | Gitlin et al. ...................... | 179/170.2 |
| 4,162,378 | 7/1979 | Baudoux et al. .................. | 379/411 |
| 4,349,889 | 9/1982 | Van Den Elzen et al. ....... | 370/32.1 |
| 4,464,545 | 8/1984 | Werner ............................... | 370/32.1 |
| 4,481,385 | 11/1984 | Kalfs .................................. | 370/32.1 |
| 4,571,720 | 2/1986 | Chevreau et al. ................. | 379/411 |
| 4,577,309 | 3/1986 | Barazeche et al. ................ | 370/32.1 |
| 4,587,382 | 5/1986 | Yang .................................. | 370/32.1 |

FOREIGN PATENT DOCUMENTS 0091014 12/1983 European Pat. Off. .
04540 10/1985 World Int. Prop. O. .

Primary Examiner—Robert L. Griffin
Assistant Examiner—Leslie Van Beek
Attorney, Agent, or Firm—Staas & Halsey

[57] ABSTRACT

A two-wire full duplex frequency division multiplex (FDM) modem system having a unit for cancelling a transmission signal, taking into consideration the line distortion characteristics. The FDM modem system includes two modem units connected through the two-wire full duplex transmission line.

Each modem unit includes a unit for modulating a transmission data, a unit for synthesizing the modulated transmission signal and a reception signal, a unit for adding the signal from the synthesizing unit and a signal, a unit for demodulating the reception signal, and a unit for generating the signal supplied to the adding unit cancelling a transmission echo signal included in the signal from the synthesizing unit, from the signal modulated at the modulating unit and the signal from the adding unit. The adding unit subtracts the signal generated at the echo cancellation signal generation unit from the signal from the synthesizer unit.

The FDM may further include a unit, for receiving the signal from the adder unit, passing a signal having the transmission frequency band, and supplying same to the echo cancellation signal generation unit as a signal for compressing the line characteristics.

8 Claims, 7 Drawing Sheets

TWO-WIRE FULL DUPLEX FREQUENCY DIVISION MULTIPLEX MODEM SYSTEM HAVING ECHO CANCELLATION MEANS

BACKGROUND OF THE INVENTION

1. Field of the Invention

The present invention relates to a data communication system. More particularly, it relates to a two-wire full duplex frequency division multiplex (FDM) modulator and demodulator (MODEM) system having echo cancellation means and mainly used for a relatively low speed data transmission system.

2. Description of the Related Art

For two-wire full duplex MODEM systems using telephone lines and having a relatively low data transmission rate, the CCITT recommends a FDM MODEM system according to, for example, a standard V.22 bis: 2400 bits per second duplex modem standardized for use in general switched telephone networks and leased circuits, and an echo cancellation MODEM system according to, for example, a standard V.26 ter.

In the FDM MODEM system, a frequency band of 0.3 to 3.4 kHz on the telephone line is divided into two. One divided frequency band is used as a transmission frequency band, and the other divided frequency band is used as a reception frequency band. Accordingly, the FDM MODEM system has a merit of a simple and accurate extraction of a received signal at a reception MODEM. On the other hand, since a precise frequency discrimination is needed, complex and costly filters must be provided in the MODEM.

The echo cancellation can be achieved by a digital signal processing technique, and thus the costly filters become unnecessary. Nevertheless, difficult digital processing is required and a high precision extraction of the received signal can not be realistically achieved.

As described above, both systems suffer from antinomic problems.

In addition, the public telephone transmission networks connect a variety of modems. In order to facilitate the connection between and through a variety of modems, the establishment of standard hardware for a modem system is strongly required.

SUMMARY OF THE INVENTION

An object of the present invention is to provide a relatively low transmission speed two-wire full duplex transmission system that is practical, has a low cost, and has a high frequency discrimination ability.

Another object of the present invention is to provide a relatively low transmission speed two-wire full duplex transmission system having standard structures applicable to a variety of transmission systems of different speeds.

According to the present invention, there is provided a frequency division multiplex modem system including: a unit for modulating a transmission signal of a first frequency band and demodulating a reception signal of a second frequency band different to the first frequency band and closely adjacent to the first frequency band; a unit having a two-wire duplex line structure for transmitting the transmission signal and the reception signal therethrough; and a unit for modulating another transmission signal of the second frequency band as the reception signal to the modulating and demodulating (modem) unit and demodulating another reception signal of the first frequency band as the transmission signal from the modem unit.

Each modem unit includes (a) a unit for modulating transmission data, (b) a unit, operatively connected to the modulating unit and the transmission line unit, for synthesizing the modulated transmission signal and the reception signal, (c) a unit, operatively connected to the synthesizing unit, for adding the signal from the synthesizing unit and a signal, (d) a unit, operatively connected to the adding unit, for demodulating the reception signal, and (e) a unit, operatively connected between the modulating unit and the adding unit and to the adding unit for receiving the signal therefrom, for generating the signal supplied to the adding unit cancelling a transmission echo signal included in the signal from the synthesizing unit, from the signal modulated at the modulating unit and the signal from the adding unit. The adding unit subtracts the signal generated at the echo cancellation signal generation unit from the signal from the synthesizer unit.

The modem unit may include a digital to analog converter, operatively connected between the modulating unit and the synthesizing unit, converting the modulated signal of a digital form into an analog signal, and an analog to digital converter, operatively connected between the adder, and the demodulating unit and the echo cancellation signal generating unit, converting the signal of an analog from the adder unit into a digital signal. The modulating unit and the demodulating unit perform a digital signal processing, and the synthesizing unit and the adder unit perform an analog signal processing.

The echo cancellation signal generating unit may include a transversal type filter having a plurality of series-connected delaying portions, a first of which receives the modulated transmission signal from the modulating unit, a plurality of coefficient multipliers each connected to an output of a corresponding delay portion and receiving the signal from the adding unit, and an adder receiving the coefficient multiplied signals from the coefficient multipliers.

The demodulating unit may include a demodulating portion, a roll-off filter and an automatic equalizer having a transversal type filter.

The frequency division multiplex modem system may further include a unit, operatively connected to the echo cancellation signal generating unit and the adder unit, for receiving the signal from the adder unit, passing a signal having the transmission frequency band, and supplying same to the echo cancellation signal generation unit as a signal for compensating the line characteristics.

The modem unit may also include a second digital to analog converter, operatively connected between the echo cancellation signal generating unit and the adder unit, converting the echo cancellation signal of a digital form into an analog signal, so that the echo cancellation signal generating unit also performs a digital signal processing.

The band pass filter unit may include a first multiplier multiplying the signal from the analog to digital converter and a carrier having a center frequency of the transmission frequency band, a transversal type filter receiving the multiplied signal and a second multiplier multiplying the signal from the transversal type filter and the carrier.

BRIEF DESCRIPTION OF THE DRAWINGS

Other object and features of the present invention will be described in detail with reference to the accompanying drawings, in which.

DESCRIPTION OF THE PREFERRED EMBODIMENT

Figure 1:
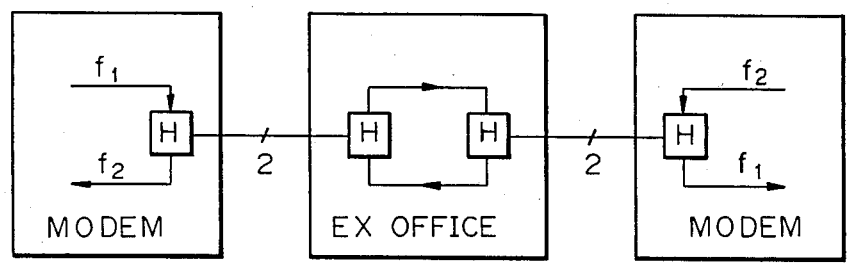
FIG. 1 is a block diagram of a two-wire full duplex MODEM system to which an FDM modem of the present invention can be applied.
Figure 2:
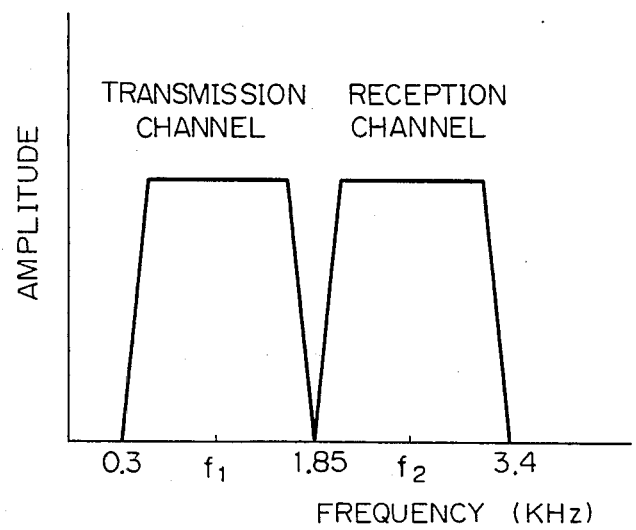
FIG. 2 is a graph illustrating a frequency band which a FDM modem of the present invention uses.

Referring to FIG. 1, a two-wire full duplex MODEM system includes a MODEM, an exchange office (EX OFFICE), another MODEM, and public telephone communication lines between the MODEM and the exchange office and between the exchange office and the other MODEM. In FIG. 1, reference H denotes a hybrid circuit, and each line consists of two wires. The system of FIG. 1 is thus a so-called two-wire and four-wire hybrid communication system. A frequency division multiplexing (FDM) MODEM system of FIG. 1 uses a frequency band between 0.3 kHz and 3.4 kHz, as shown in FIG. 2. The frequency band is divided into two frequency bands: a frequency band of a center frequency $f_1$ using a transmission channel of the MODEM, and conversely, a reception channel of another MODEM, and another frequency band of a center frequency $f_2$ using a reception channel for the MODEM, and conversely, a transmission channel for another MODEM.

Before describing preferred embodiments of the present invention, a description will be given of the prior art and the differences between the prior art and the present invention distinguished.

Figure 3:
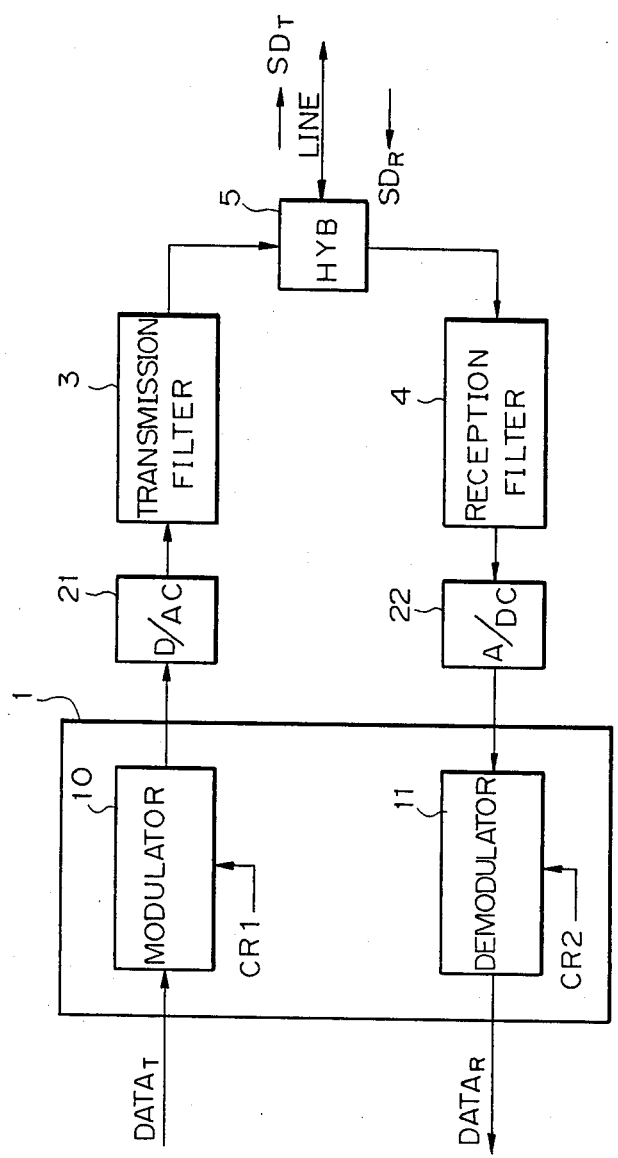
FIG. 3 is a circuit diagram of an FDM modem of the prior art.

FIG. 3 is a circuit diagram of an FDM modem of the prior art which is installed at both ends of the system in FIG. 1. The FDM modem includes a processor 1 having a modulator 10 and a demodulator 11, a digital-to-analog (D/A) converter 21, a transmission filter 3, a hybrid circuit 5, a reception filter 4, and an analog-to-digital (A/D) converter 22. Preferably, a low pass filter is provided between the transmission filter 3 and the hybrid circuit 5, and another low pass filter is provided between the hybrid circuit 5 and the reception filter 4.

The modulator 10 modulates transmission data DATA$_T$ in digital form with a first carrier CR1 having a frequency of, for example, $f_1$ shown in FIG. 2. The modulated digital transmission data is converted to analog data at the D/A converter 21. The analog transmission data is frequency-limited between 0.3 and 1.85 kHz as shown in FIG. 2 at the transmission filter 3. The frequency-limited analog transmission data SD$_T$ is transmitted to another FDM modem through the hybrid circuit 5. Conversely, a reception signal SD$_R$ on the transmission line from another FDM modem and having a center frequency of $f_2$ is received at the hybrid circuit 5 and frequency-limited between 1.85 and 3.4 kHz at the reception filter 4. The frequency-limited reception signal is converted to an analog signal at the A/D converter 22. The converted reception signal is demodulated with another carrier having a frequency of $f_2$ to obtain a digital reception data DATA$_R$.

Since the passing frequency band is too narrow, as shown in FIG. 2, and the frequency characteristics has steep slopes, the transmission filter 3 and the reception filter 4 must have high frequency discrimination characteristics. In addition, both filters must be low loss type. Accordingly, both filters must be mechanical filters, better-worse filters having a large number of steps, etc. As a result, the FDM modem suffers from a disadvantage of high cost.

Preferred embodiments of the present invention will be described.

Figure 4:
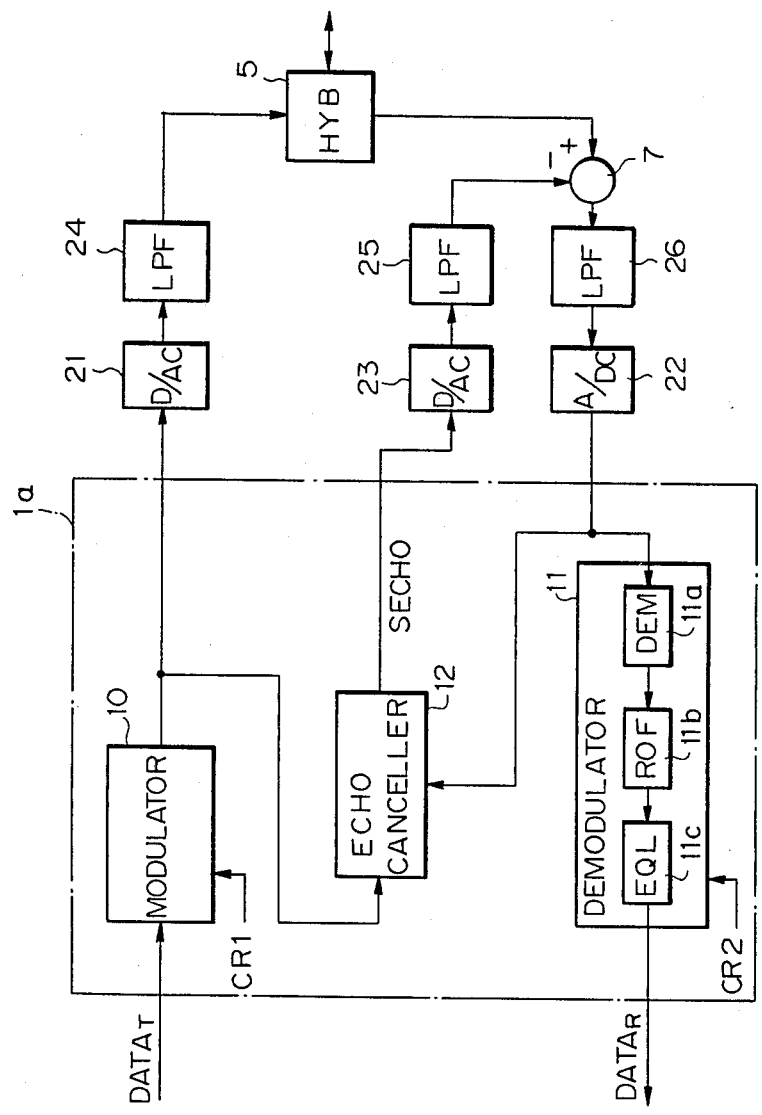
FIG. 4 is a circuit diagram of an embodiment of an FDM modem according to the present invention.

FIG. 4 is a circuit diagram of an FDM modem of an embodiment according to the present invention.

In FIG. 4, the FDM modem includes an echo canceller 12 in a processor 1a, a D/A converter 23, and a signal synthesizer (or adder) 7, in addition to the FDM modem of FIG. 3. Low pass line filters 24 to 26 are optionally provided to limit the signals therethrough in a frequency band of the telephone line: 0.3 kHz to 3.4 kHz. These filters can be provided in the prior FDM modem of FIG. 3.

Note that the transmission filter 3 and the reception filter 4 in the FDM modem of FIG. 3 are omitted.

The demodulator 11 includes a demodulating portion 11a, a roll-off filter 11b and an automatic equalizer 11c. The demodulating portion 11a demodulates a received signal from the A/D converter 22 with the carrier CR2 having a frequency $f_2$. The roll-off filter 11b cuts a high frequency component of the demodulated signal and makes a wave form shape. The automatic equalizer 11c includes a transversal type equalizer and rejects the interference between codes to obtain a reception data DATA$_R$.

Figure 5:
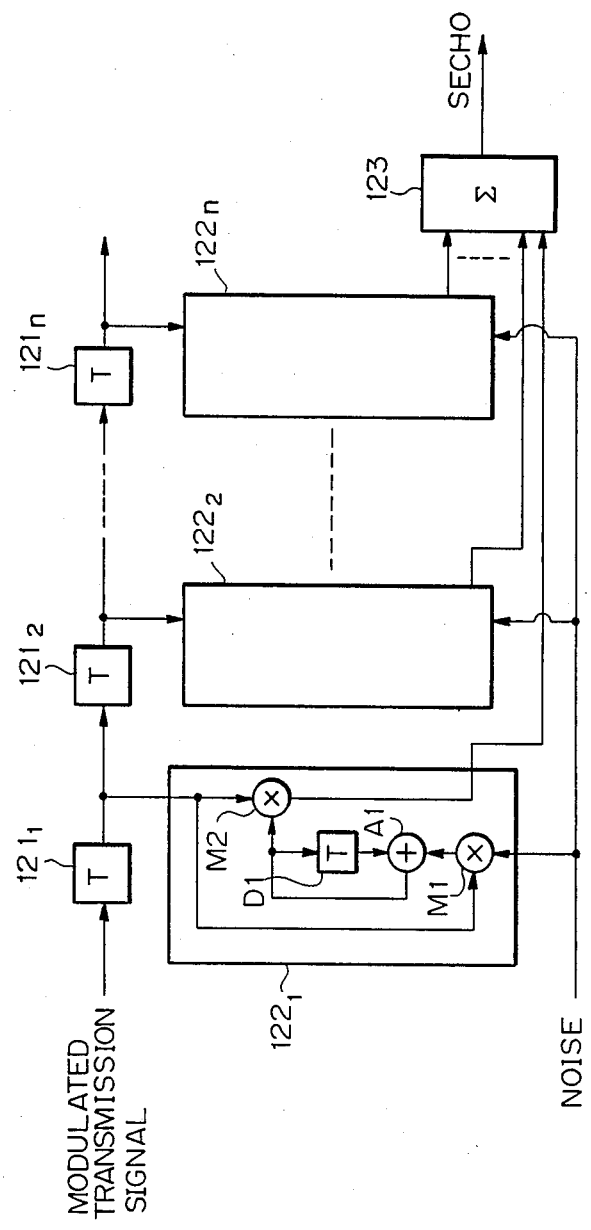
FIG. 5 is a circuit diagram of an echo canceller shown in FIG. 4.

FIG. 5 is a circuit diagram of the echo canceller 12. The echo canceller 12 includes n steps of taps 121$_1$ to 121$_n$, n steps of coefficient multiplier 122$_1$ to 122$_n$, and an adder 123. The echo canceller 12 receives a modulated transmission signal from the modulator 10. Each tap delays the modulated transmission signal. Each coefficient multiplier includes a multiplier M1, an adder A1, a tap T, and a multiplier M2. The echo canceller 12 also receives a D/A converted reception signal from the A/D converter 22. The multiplier M1 multiplies the delayed signal of the tap 121$_1$ and the reception signal from the A/D converter 22. The tap T delays one previous data with a delay D1. The adder A1 adds the multiplied signal from the multiplier M1 and the delayed signal from the tap T. The multiplier M2 multiplies the signal delayed at the tap 121$_1$ and the signal added at the adder A1 as a tap coefficient. The signal multiplied at the multiplier M2 is supplied to the adder 123. The adder 123 receives n output signals from the coefficient multipliers 122$_1$ to 122$_n$, adds the same and outputs an echo cancellation signal SECHO.

As can be easily understood from the above description, the echo canceller 12 has a transversal type variable filter the same as that of the automatic equalizer 11c. The echo canceller 10 receives the transmission signal, compensates the same by the transmission line delay characteristics including the delay characteristics of the transmission lines, another FDM modem oppositely provided, and the D/A converters 21, 23, the A/D converter 22, the filters 24 to 26, the hybrid circuit 5 and the adder 7 in the FDM modem in question, on the basis of the transmission signal from the A/D converter 22, and outputs the echo cancellation signal SECHO with respect to the transmission signal.

Figure 6A:
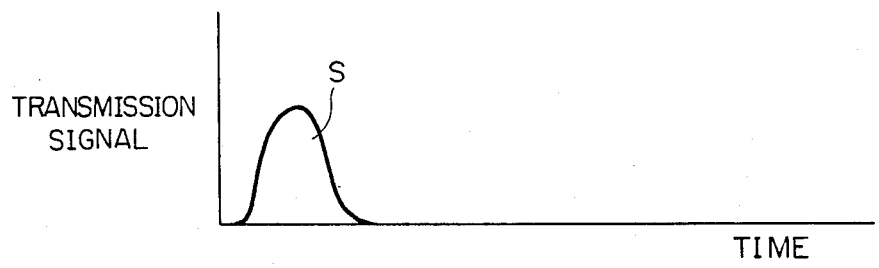
FIGS. 6a and 6b are graphs illustrating a transmission signal wave form in the FDM modem shown in FIG. 4 and an echo cancelling signal wave form generated at the echo canceller shown in FIG. 5.
Figure 6:
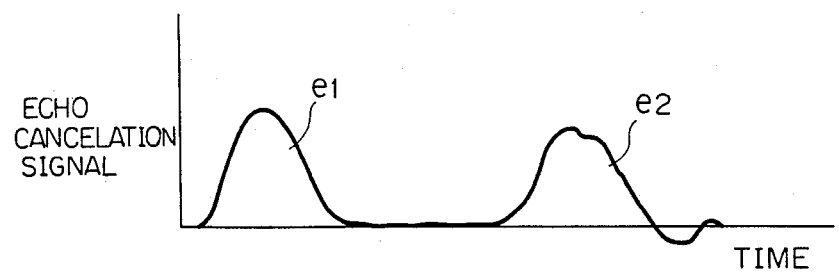

Referring back to FIG. 4, upon receipt of the transmission data $DATA_T$ having a digital form, the modulator 10 modulates the same with the carrier CR1 having the frequency $f_1$. The modulated signal as shown in FIG. 6a is supplied to the D/A converter 21 and the echo canceller 12. The D/A converter 21 converts the modulated transmission signal to an analog signal, and the analog signal is passed through the low pass filter 24 to impose a frequency limit of between 0.3 and 3.4 kHz. The frequency limited analog transmission signal is supplied to the hybrid circuit 5 and joined with the reception signal having the frequency $f_2$ from another FDM modem, and transmitted to another FDM modem through the telephone line.

The signals of the transmission signal having the frequency $f_1$ and the reception signal having the frequency $f_2$ combined at the hybrid circuit 5 are supplied to the adder 7.

Simultaneously, the echo canceller 12 generates the echo cancellation signal SECHO depending on the transmission signal from the modulator 10. The echo cancellation signal SECHO is converted to an analog signal at the D/A converter 23. The D/A converted signal is supplied to an inverted terminal of the adder 7 through the low pass filter 25.

The adder 7 subtracts the echo cancellation signal from the combined signals from the hybrid circuit 5. As a result, the adder 7 outputs the reception signal of frequency $f_2$ and a noise signal due to the distortion of the line characteristics and having approximately a frequency $f_1$. The signals from the adder 7 are frequency-limited between 0.3 and 3.4 kHz at the low pass filter 26. The frequency-limited signals are converted into digital signals at the D/A converter 22.

The noise signal due to the line delay characteristics and having approximately a frequency $f_1$ is supplied to the echo canceller 12. The echo canceller 12 compensates the transmission signal from the modulator 10 on the basis of the noise signal and outputs the compensated transmission signal as shown in FIG. 6b, thus completely cancelling the transmission signal from the hybrid circuit 5.

In FIG. 6b, curve e1 represents a first echo cancellation signal for cancelling the transmission signal immediately output from the hybrid circuit 5. Curve e2 represents a second cancellation signal for cancelling the transmission signal returned from the communication lines and another FDM modem, and thus distorted due to the line characteristics.

The reception signal from the A/D converter 22 is demodulated by the carrier of frequency $f_2$ at the demodulating portion 11a, filtered at the roll-off filter 11b, and automatic-equalized at the automatic equalizer 11c. As a result, the reception signal $DATA_R$ can be obtained.

In a pure echo cancellation MODEM system, the same frequency is used for a transmission signal and a reception signal, and accordingly, echo cancellation is difficult and a complex echo cancellation process is needed.

Conversely, the FDM system uses different frequency bands for the transmission signal and the reception signal. In addition, in a system having a relatively low transmission rate equal to 2400 bits per second or lower, an eye pattern is open. Accordingly, even if the S/N ratio is bad, it is enough to obtain the echo cancellation for locally strong echoes. In other words, high order paths in the transversal filter of the echo canceller 12 can be omitted. Furthermore, the roll-off filter 11b per se has a cancellation function. As a result, the echo canceller 12 can carry out the cancellation of a noise signal of approximately 20 ms to 30 ms. For example, the echo canceller 12 can provide 20 to 30 of the taps $121_1$ to $121_{20}$ or $121_{30}$ and 20 to 30 of the coefficient multipliers $122_1$ to $122_{20}$ or $122_{30}$, when each tap has 1 ms delay characteristics.

The echo canceller 12 naturally performs an automatic phase adjustment.

The A/D converter 22 can be provided between the hybrid circuit 5 and the adder 7 instead of between the low pass filter 26 and the modulator 11. In this case, however, a high precision and large bit A/D converter must be installed.

In the FDM MODEM system using the FDM modem set forth above, the modulator 10 carries out an amplitude phase modulation for 2400 bits per second, of 16 multilevels: four by four according to V.22 bis, or four multilevels according to V.26 ter.

In the above description, the FDM modem at the one end using a center frequency of $f_1$ for the data transmission and a center frequency of $f_2$ is described. Another FDM modem at another end, using a center frequency of $f_2$ for the data transmission and a center frequency of $f_1$, naturally carries out the echo cancellation for the frequency of $f_2$.

Figure 7:
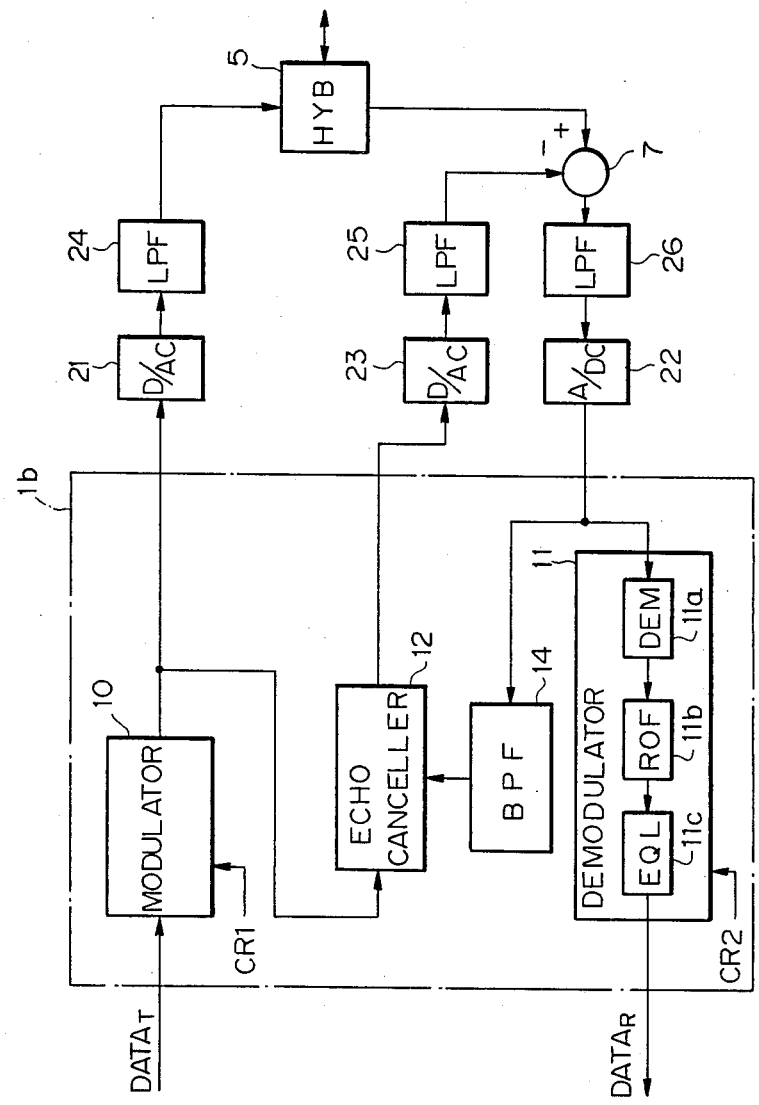
FIG. 7 is a circuit diagram of another embodiment of an FDM modem according to the present invention.

Referring to FIG. 7, another embodiment of an FDM modem according to the present invention will be described.

The echo cancellation is available for the random pattern transmission data, in other words, the echo cancellation is unavailable for the regular pattern transmission data, for example, 75 bits per second modem, because the number of taps in the echo canceller 12 must be fixed.

In order to apply the FDM modem set forth above, another FDM modem as shown in FIG. 7 including a band pass filter 14 is provided in addition to the FDM modem shown in FIG. 4.

The band pass filter 14 may be a finite impulse response (FIR) type filter or an infinite impulse response (IIR) type filter.

Figure 8:
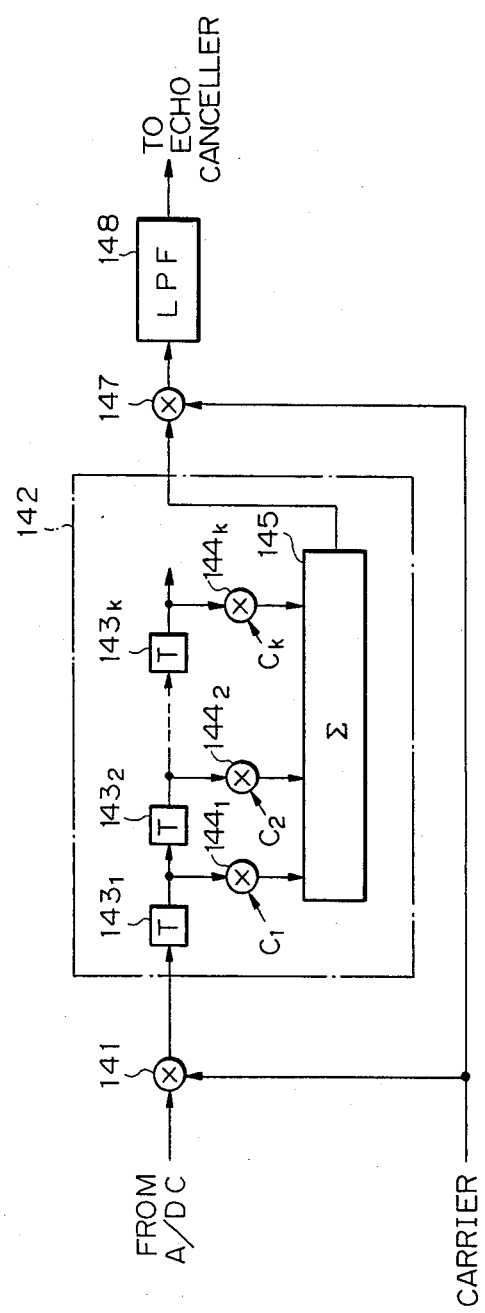
FIG. 8 is a circuit diagram of a band pass filter shown in FIG. 7.

FIG. 8 is a circuit diagram of the FIR type filter. The FIR type band pass filter includes a multiplexer 141, a transversal type filter 142, a multiplexer 147 and a low pass filter 148. The transversal type filter 142 includes a plurality of taps $143_1$ to $143_k$ each of which may have 1 ms delay characteristics, a plurality of multipliers $144_1$ to $144_k$ each of which multiplies a delayed signal from each tap and a coefficient $c_1$ to $c_k$ each of which is constant. A carrier having the frequency $f_1$ is supplied to the multipliers 141 and 147.

The signal from the D/A converter 22 is multiplied by the carrier at the multiplier 141, reducing a low frequency signal. The frequency-reduced signal is supplied to the transversal type filter 142 and filtered thereat. The filtered signal is multiplied by the carrier at the multiplier 147, increasing a high frequency signal and thus restoring the frequency to that from the A/D converter 22. The signal from the multiplier 147 is preferably passed through the low pass filter 148 and supplied to the echo canceller 12.

The band pass filter 14 extracts the signal having the frequency band of the transmission signal from the signal of the A/D converter 22, and provides only the noise signal due to the line delay characteristics. The echo canceller 12 uses the noise signal for generating the echo cancellation signal SECHO.

The band pass filter 14 can be provided in not only the FDM modem for treating the regular pattern transmission data but also the FDM modem for treating the random pattern transmission data.

The echo canceller 12 includes the transversal type filter as shown in FIG. 5. The band pass filter 14 also includes the transversal type filter as shown in FIG. 8. These transversal type filters are similar to the filter in the automatic equalizer 11c. Accordingly, the echo canceller 12 and the band pass filter 14 are easily realized by applying the technology for making the automatic equalizer 11c. This facilitates the production of the FDM modem.

The FDM modems set forth above are easily applicable to any type of two-wire duplex MODEM systems having a relatively low transmission speed, by changing the parameters of the echo canceller and the band pass filter. This contributes to the establishment of a standard FDM modem.

The above processor, which may include the modulator 10, the demodulator 11, the echo canceller 12 and the band pass filter 14, can be realized by a digital processing processor large scaled integrated circuit (LSI) of one chip, such as Fujitsu MB-8764.

Many widely different embodiments of the present invention may be constructed without departing from the spirit and scope of the present invention. It should be understood that the present invention is not limited to the specific embodiments described in this specification, except as defined in the appended claims.

I claim:

1. A frequency division multiplex modem system, comprising:
    first modem means for modulating first data to produce a first modulated signal having a first frequency band and for demodulating a second modulated signal having a second frequency band, said first and second frequency bands being adjacent and non-overlapping;
    transmission line means, having a two-wire duplex line structure, for transmitting said fist and second modulated signals therethrough; and
    second modem means for modulating second data to produce the second modulated signal, having said second frequency band and received by said first modem means, and demodulating said first modulated signal from said first modem means;
    said first and second modem means each comprising:
        modulating means for modulating transmission data to produce a modulated transmission signal using digital signal processing,
        synthesizer means, operatively connected to said modulating means and said transmission line means, for synthesizing said modulating transmission signal and a modulating reception signal containing an echoed transmission signal using analog processing and for outputting said modulated transmission and reception signals to said transmission line means,
        subtracter means, operatively connected to said synthesizer means, for subtracting a combined echo cancellation signal from said modulated reception signal to produce a result signal using analog processing,
        demodulating means, operatively connected to said subtracter means, for demodulating said result signal to produce received data using digital signal processing,
        echo canceller means, operatively connected to said modulating means and said subtracter means for receiving said modulated transmission and result signals therefrom and for using digital processing to generate said combined echo cancellation signal, supplied to said subtracter means, in dependence upon said modulated transmission signal and said result signal from said substracter means, said combined echo cancellation signal including a first echo cancellation signal for cancelling said modulated transmission signal as output from said synthesizer means and a second echo signal for cancelling said echoed transmission signal in said modulated reception signal,
        a digital-to-analog converter, operatively connected between said modulating means and said synthesizer means, for converting said modulated transmission signal from digital form to an analog signal, and
        an analog-to-digital converter, operatively connected to said subtracter means, said demodulating means and said echo canceller means, for converting said result signal from said subtracter means to a digital signal.

2. A frequency division multiplex modem system, comprising:
    first modem means for modulating first data to produce a first modulated signal having a first frequency band and for demodulating a second modulated signal having a second frequency band, said first and second frequency bands being adjacent and non-overlapping;
    transmission line means, having a two-wire duplex line structure, for transmitting said first and second modulated signals therethrough; and
    second modem means for modulating second data to produce the second modulated signal, having said second frequency band and received by said first modem means, and demodulating said first modulated signal from said first modem means;
    said first and second modem means each comprising:
        modulating means for modulating transmission data to produce a modulated transmission signal,
        synthesizer means, operatively connected to said modulating means and said transmission line means, for synthesizing said modulated transmission signal and a modulated reception signal containing an echoed transmission signal and for outputting said modulated transmission and reception signals to said transmission line means,
        subtractor means, operatively connected to said synthesizer means, for subtracting a combined echo cancellation signal from said modulated reception signal to produce a result signal, demodulating means, operatively connected to said subtracter means, for demodulating said result signal to produce received data, and echo canceller means, operatively connected to said modulating means and said subtracter means for receiving said modulated transmission and result signals therefrom and for generating said combined echo cancellation signal, supplied to said subtracter means, in dependence upon said modulated transmission signal and said result signal from said subtracter means, said combined echo cancellation signal including a first echo cancellation signal for cancelling said modulated transmission signal as output from said synthesizer means and a second echo signal for cancelling said echoed transmission signal in said modulated reception signal, said echo canceller means including a transversal type filter comprising:

a plurality of series-connected delaying portions having a first end receiving said modulated transmission signal from said modulating means;

a plurality of coefficient multipliers, producing coefficient multiplied signals, each connected to an output of a corresponding delay portion and receiving said result signal as said digital signal from said analog-to-digital converter; and an adder receiving said coefficient multiplied signals from said coefficient multipliers.

3. A frequency division multiplex modem system according to claim 2, wherein said demodulating means includes a demodulating portion, a roll-off filter and an automatic equalizer having a transversal type filter, all connected in series.

4. A frequency division multiplex modem system, comprising:

first modem means for modulating first data to produce a first modulated signal having a first frequency band and for demodulating a second modulated signal having a second frequency band, said first and second frequency bands being adjacent and non-overlapping;

transmission line means, having a two-wire duplex line structure, for transmitting said first and second modulated signals therethrough; and second modem means for modulating second data to produce the second modulated signal, having said second frequency band and received by said first modem means, and demodulating said first modulated signal from said first modem means;

said first and second modem means each using one of said first and second frequency bands as a transmission frequency band for modulation of said transmission data and comprising:

modulating means for modulating transmission data to produce a modulated transmission signal, synthesizer means, operatively connected to said modulating means and said transmission line means, for synthesizing said modulated transmission signal and a modulated reception signal containing an echoed transmission signal and for outputting said modulated transmission and reception signals to said transmissionline means, subtracter means, operatively connected to said synthesizer means, for subtracting a combined echo cancellation signal from said modulated reception signal to produce a result signal, demodulating means, operatively connected to said subtracter means, for demodulating said result signal to produce received data, echo canceller means, operatively connected to said modulating means and said subtracter means for receiving said modulated transmission and result signals therefrom and for generating said combined echo cancellation signal, supplied to said substracter means, in dependence upon said modulated transmission signal and said result signal from said subtracter means, and combined echo cancellation signal including a first echo cancellation signal for cancelling said modulated transmission signal as output for said synthesizer means and a second echo signal from cancelling said echoed transmission signal in said modulated reception signal, said echo canceller means including a transversal type filter comprising:

a plurality of series-connected delaying portions having a first end receiving said modulated transmission signal from said modulating means;

a plurality of coefficient multipliers, producing coefficient multiplied signals, each connected to an output of a corresponding delay portion and receiving said result signal as said digital signal from said analog-to-digital converter; and an adder receiving said coefficient multiplied signals from said coefficient multipliers, a first digital-to-analog converter, operatively connected between said modulating means and said synthesizer means, for converting said modulated signal from digital form to a first analog signal, a second digital-to-analog converter, operatively connected between said echo canceller means and said subtracter means, for converting said combined echo cancellation signal from digital form to a second analog signal; and an analog-to-digital converter, operatively connected to said subtracter means, said demodulating means and said echo canceller means, for converting said result signal from said subtracter means to a digital signal, and band pass filter means, operatively connected to said echo canceller means and said subtracter means, for receiving said result signal from said subtracter means and passing a portion of said result signal within said transmission frequency band to said echo canceller means for compensating line characteristics, comprising a first multiplier multiplying said digital signal from said analog-to-digital converter and a carrier signal having a center frequency of said transmission frequency and to produce a multiplied signal;

a transversal type filter receiving said multiplied signal and outputting a filtered signal; and a second multiplier multiplying said filtered signal from said transversal type filter and said carrier signal to output the portion of said result signal within said transmission frequency band.

5. A frequency division multiplex modem system according to claim 4, wherein said demodulating means includes a demodulating portion, a roll-off filter and an automatic equalizer having a transversal type filter, all connected in series.

6. A frequency division multiplex modem for use with an identical modem coupled thereto by a two-wire duplex line, said modem comprising:

modulator means for modulating transmission data to produce a frequency division multiplex modulated transmission signal in a first band;

a digital/analog converter, operatively connected to receive the modulated transmission signal from said modulator means, for converting the modulated transmission signal to an analog transmission signal;

synthesizer means for supplying the analog transmission signal to the identical modem via the two-wire duplex line and for receiving an analog reception signal having a second frequency band from the identical modem via the two-wire duplex line, the first and second frequency bands being adjacent and non-overlapping and the analog reception signal containing an echoed transmission signal;

subtracter means for subtracting a combined echo cancellation signal from the analog reception signal to produce a result signal;

an analog/digital converter, operatively connected to receive the result signal from said subtracter means, for converting the result signal to a modulated reception signal;

demodulator means for demodulating the modulated reception signal to produce received data; and echo canceller means for generating the combined echo cancellation signal supplied to said subtracter means, using digital processing and digital/analog conversion, in dependence upon the modulated transmission signal and the modulated reception signal, the combined echo cancellation signal including a first echo cancellation signal for cancelling the modulated transmission signal as output from said synthesizer means and a second echo cancellation signal for cancelling the echoed transmission signal in the analog reception signal.

7. A frequency division multiplex modem according to claim 6, further comprising band pass filter means for filtering the modulated reception signal output by said analog/digital converter and passing only that portion of the modulated reception signal within the first frequency band to said echo canceller means.

8. A frequency division multiplex modem for use with an identical modem coupled thereto by a two-wire duplex line, said modem comprising:

modulator means for modulating transmission data to produce a frequency division multiplex modulated transmission signal in a first band;

synthesizer means for supplying the modulated transmission signal to the identical modem via the two-wire duplex line and for receiving a modulated reception signal having a second frequency band from the identical modem via the two-wire duplex line, the first and second frequency bands being adjacent and non-overlapping and the modulated reception signal containing an echoed transmission signal;

subtracter means for subtracting a combined echo cancellation signal from the modulated reception signal to produce a result signal;

demodulator means for demodulating the modulated reception signal to produce received data;

band pass filter means for filtering the result signal from said subtracter means and outputting a band-limited result signal corresponding to that portion of the result signal within the first frequency band; and canceller means for generating the combined echo cancellation signal supplied to said subtracter means in dependence upon the modulated transmission signal and the band-limited result signal, the combined echo cancellation signal including a first echo cancellation signal for cancelling the modulated transmission signal as output from said synthesizer means and a second echo cancellation signal for cancelling the echoed transmission signal in the modulated reception signal.

* * * * *